(12) United States Patent
Blumenau

(10) Patent No.: US 9,908,701 B2
(45) Date of Patent: Mar. 6, 2018

(54) ROBOTIC STORAGE AND RETRIEVAL SYSTEMS AND METHODS

(71) Applicant: Voodoo Robotics, Inc., Dallas, TX (US)

(72) Inventor: Trevor I. Blumenau, Plano, TX (US)

( * ) Notice: Subject to any disclaimer, the term of this patent is extended or adjusted under 35 U.S.C. 154(b) by 209 days.

(21) Appl. No.: 14/247,172

(22) Filed: Apr. 7, 2014

(65) Prior Publication Data

US 2014/0222191 A1    Aug. 7, 2014

Related U.S. Application Data

(63) Continuation-in-part of application No. 14/010,207, filed on Aug. 26, 2013.

(60) Provisional application No. 61/695,708, filed on Aug. 31, 2012.

(51) Int. Cl.
*B65G 1/137* (2006.01)
*B22D 33/00* (2006.01)

(52) U.S. Cl.
CPC .............. *B65G 1/137* (2013.01); *B22D 33/00* (2013.01)

(58) Field of Classification Search
USPC ........................................................ 700/214
See application file for complete search history.

(56) References Cited

U.S. PATENT DOCUMENTS

| | | | | |
|---|---|---|---|---|
| 4,419,734 A | * | 12/1983 | Wolfson | B65G 1/1371 700/214 |
| 4,546,443 A | * | 10/1985 | Oguchi | G05B 19/416 318/568.16 |
| 5,379,229 A | * | 1/1995 | Parsons | B65G 1/1378 414/273 |
| 6,023,699 A | * | 2/2000 | Knoblock | G06Q 10/06 |
| 2002/0032501 A1 | * | 3/2002 | Tilles | G07F 17/12 700/214 |
| 2004/0260423 A1 | * | 12/2004 | Lee | B65G 1/1371 700/214 |
| 2006/0025883 A1 | * | 2/2006 | Reeves | G06Q 10/08 700/216 |
| 2011/0035045 A1 | * | 2/2011 | Walter | B65G 1/1373 700/214 |
| 2012/0283868 A1 | * | 11/2012 | Rutt | G06Q 10/083 700/217 |

* cited by examiner

*Primary Examiner* — Kyle O Logan
(74) *Attorney, Agent, or Firm* — John Lindsay

(57) ABSTRACT

The present invention is directed to a system and method for storage and retrieval of items including a control server and a database. The database receives the shelving configuration information of a particular user environment and the control server is operable to issue travel control signals to a robotic carriage within configuration parameters retrieved from the database. An alternate configuration includes a robotic carriage. The robotic carriage further comprises a base, at least one arm, and a motor. The arm is secured to the base and presents a resting surface for the items. The motor is cooperatively secured to the robotic carriage, enabling controlled travel by the robotic carriage.

12 Claims, 11 Drawing Sheets

USER INFORMATION

Username: _____

Password: _____

Email Address: _____

Language: _____

*Permissions*

[ ] Create Shelving Configuration     [ ] Create User

[ ] Store Inventory     [ ] Retrieve Inventory

[ ] Move Inventory     [ ] View Compartment

Fig. 7

Compartment Selection

Compartment Selection

Compartment Selection

Compartment Selection

COMPARTMENT INFORMATION

Compartment Identifier:   c1234

Compartment Position:   shelfset, x, y

Compartment Dimensions:   x, y, z

*Permissions*

View Compartment

[ ] User 1   [ ] Group 1

Retrieve Inventory

[ ] User 2   [ ] Group 2

Store Inventory

[ ] User 3   [ ] Group 3

*Historical*

| Date 1 | image1 | weight1 | user1 | job1 |
|---|---|---|---|---|
| Date 2 | image2 | weight2 | user2 | job2 |
| Date 3 | image3 | weight3 | user3 | job3 |

Fig. 9

ROBOTIC STORAGE AND RETRIEVAL SYSTEMS AND METHODS

PRIORITY

This Application is related to and claims priority to U.S. Nonprovisional patent application Ser. No. 14/010,207, filed Aug. 26, 2013, which is incorporated herein for all purposes. U.S. Nonprovisional patent application Ser. No. 14/010,207 claims priority to U.S. provisional patent application Ser. No. 61/695,708, filed Aug. 31, 2012, which is incorporated herein for all purposes.

FIELD OF THE INVENTION

The invention relates generally to robotic storage and retrieval systems and methods, and more particularly, to robotic storage and retrieval control and interface systems and methods.

BACKGROUND

In many industrial applications, robots are used for storage and retrieval of items. In warehouses, shelving racks are constructed for storage of items. The shelving racks typically have multiple vertical levels. Each vertical level typically is divided horizontally to provide individual, compartmentalized storage slots into which items, such as pallets, are stored. The robots, which move both vertically and horizontally between the shelving racks, place the pallets in the shelving racks for storage and also pick up and carry the pallets away from the shelving racks for retrieval. It often takes skilled operators to control the robots due to current control interfaces. The poor control interface often leads to a steep learning curve to successfully operate the systems.

Furthermore, the robotic systems fail to address common issues in inventory management. Poor access to access to inventory makes it difficult to track inventory quantity and status, especially with diverse product lines. Additionally, current systems make it difficult to determine the points of shrinkage, destruction, or other inventory loss.

This invention addresses those and other issues.

SUMMARY

The present invention is directed to a system and method for storage and retrieval of items comprising a control server and a database. The database receives the shelving configuration information of a particular user environment and the control server is operable to issue travel control signals to a robotic carriage within configuration parameters retrieved from the database.

An alternate configuration includes a robotic carriage. The robotic carriage further comprises a base, at least one arm, and a motor. The arm is secured to the base and presents a resting surface for the items. The motor is cooperatively secured to the robotic carriage, enabling controlled travel by the robotic carriage.

In operation, the shelving configuration information of a user environment is received and input into the database. One or more control interfaces, such as a web interface, are presented for requests for inventory operations from one or more users. In response, the control server issues storage and retrieval control signals to the robotic carriage within ranges retrieved from the database.

These and other features, aspects, and advantages of the invention will become better understood with reference to the following description, appended claims, and accompanying drawings.

BRIEF DESCRIPTION OF THE DRAWINGS

FIG. 7 shows a representative user interface for entering user information;

FIG. 9 shows a representative display of compartment data.

DETAILED DESCRIPTION

Figure 1:
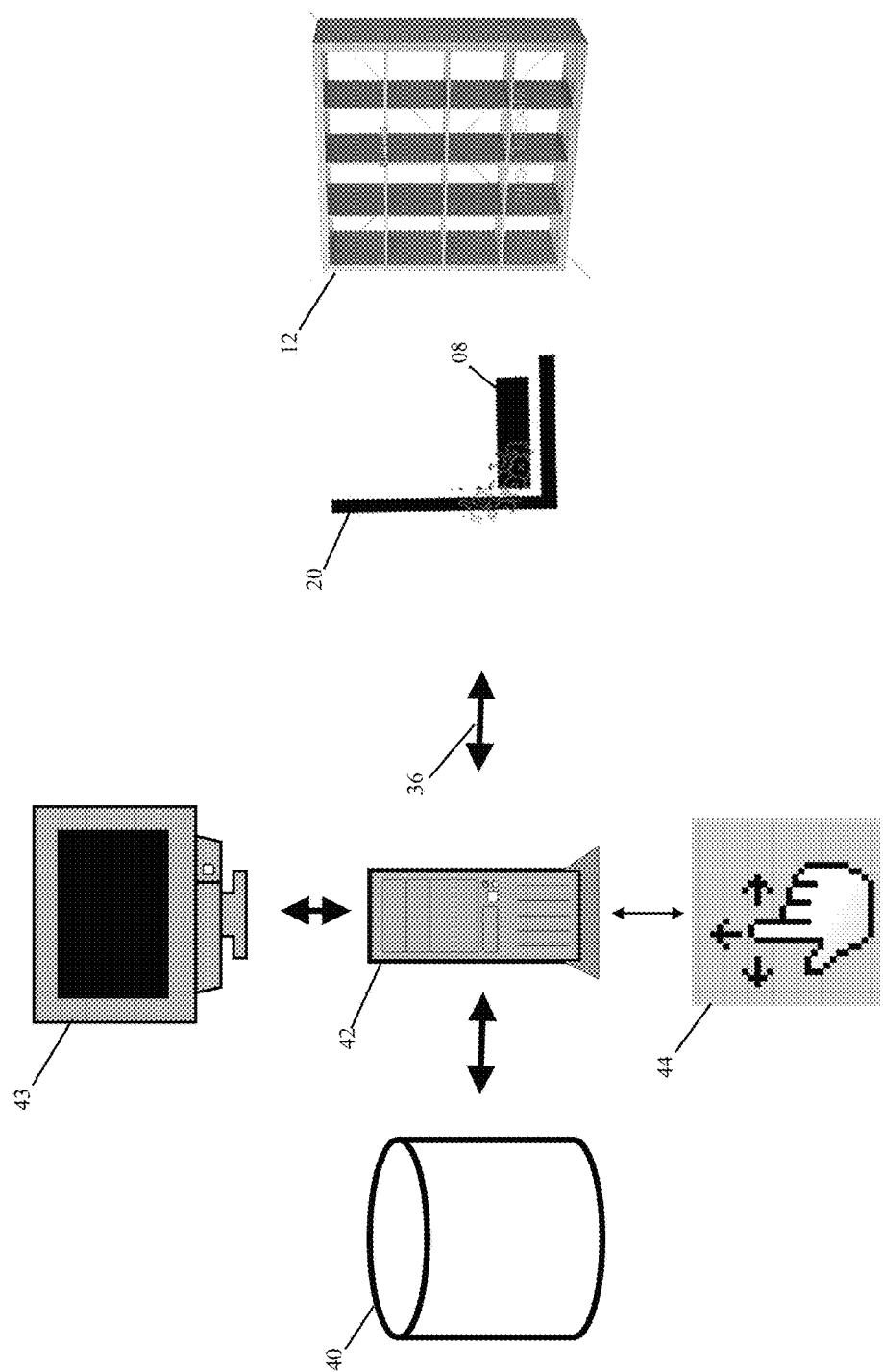
FIG. 1 shows a diagram of an embodiment of a system according to the current invention.

The current invention is directed to systems and methods for automated storage and retrieval of items from shelving racks. The systems and methods transport the item from a shelving rack to a workstation proximate the shelving rack. FIG. 1 depicts one embodiment of the invention as it may exist in an operating environment. Shown are a shelving rack 12, a robotic carriage 20, a control server 42, a display 43, a database 40, and a control interface 44.

Figure 3A:
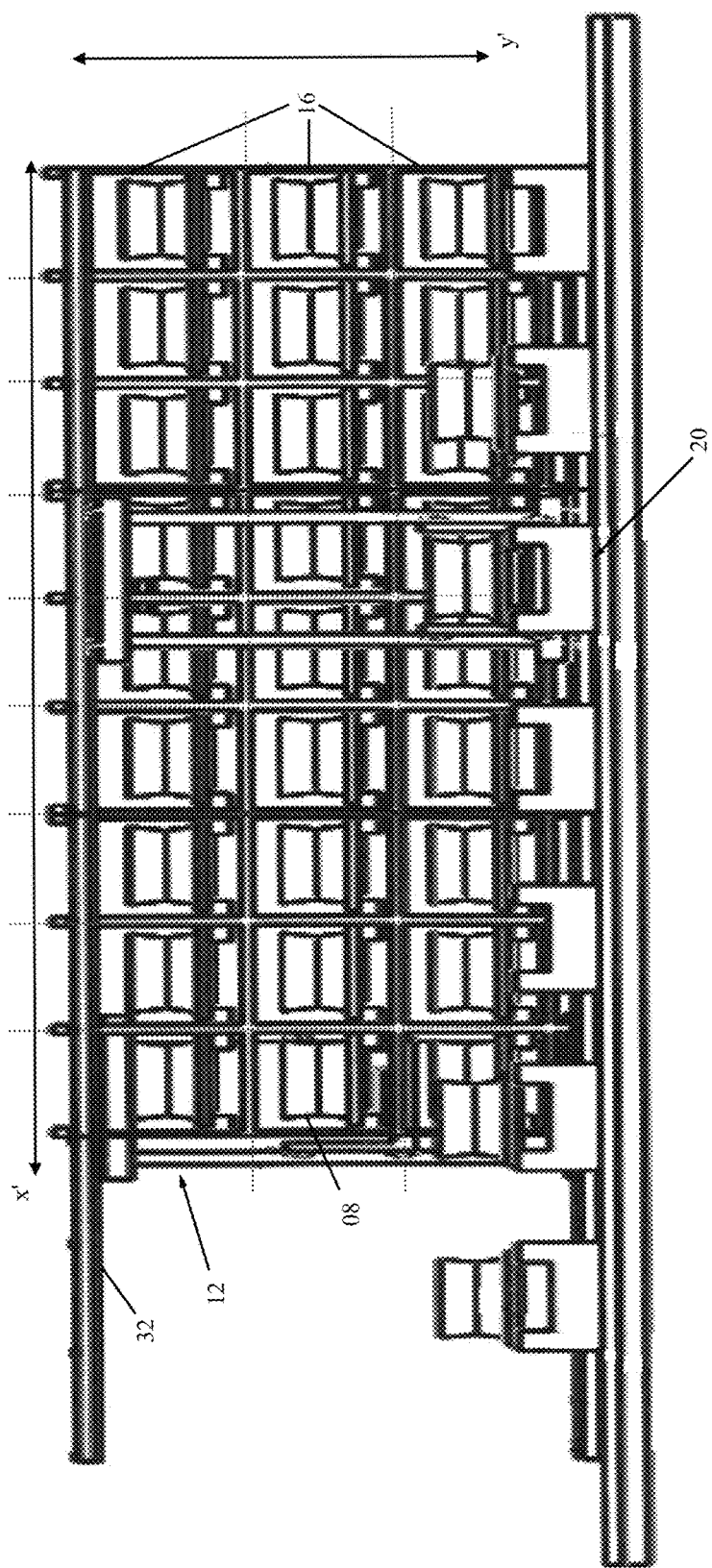
FIG. 3a shows a side view of a system having a first shelving configuration.
Figure 3B:
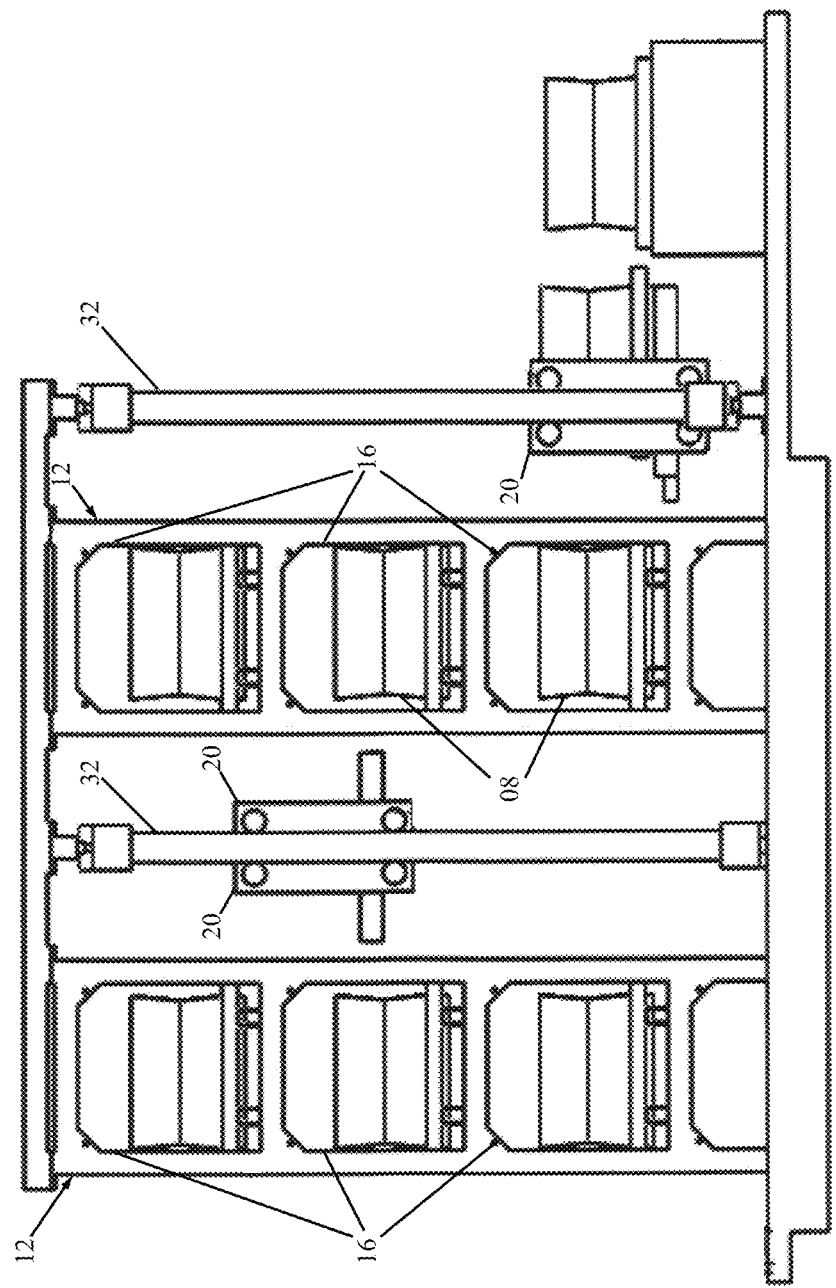
FIG. 3b shows a top view of a system having a second shelving configuration.
Figure 4:
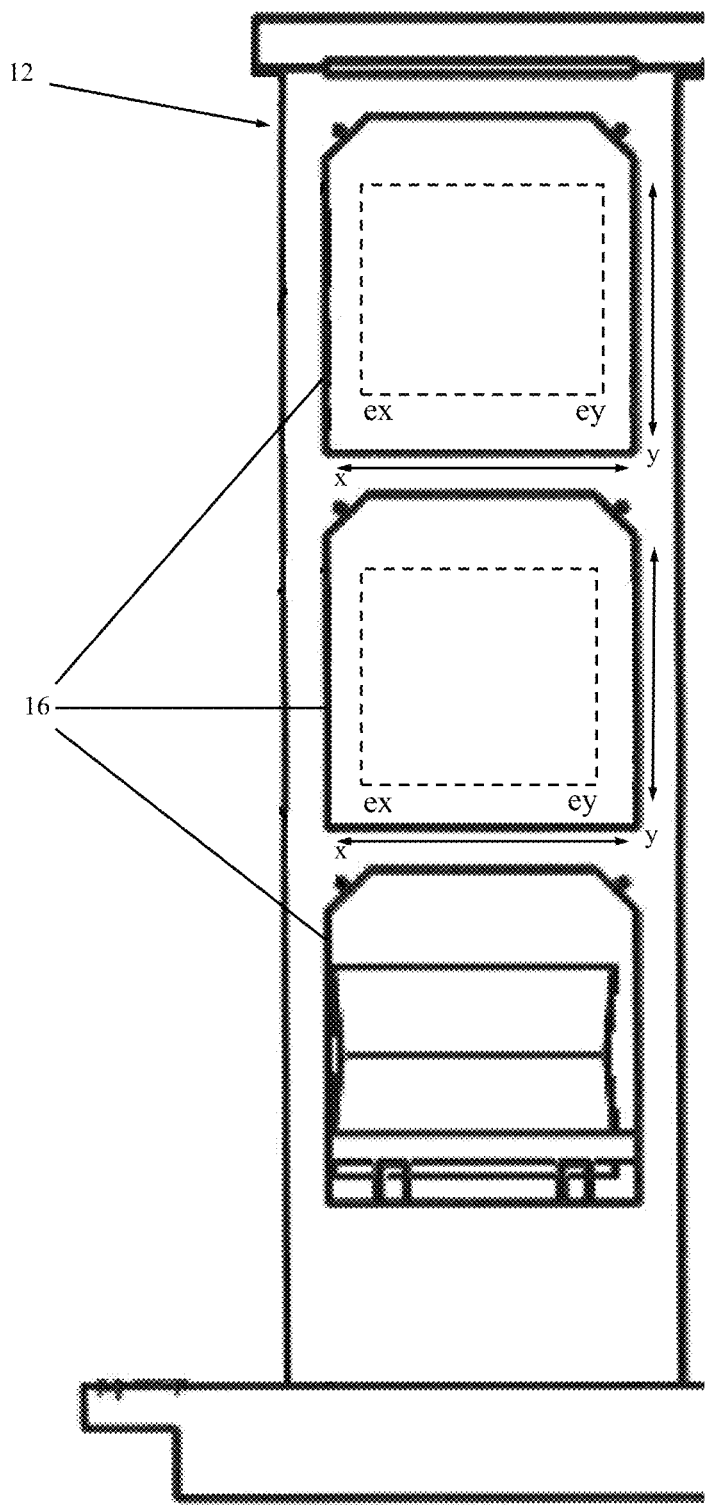
FIG. 4 shows a side view of plural slots of the shelving rack configuration of FIG. 3b.

Shelving racks 12 are operable to store items 08, such as pallets, carton, boxes, or the like. FIGS. 3a and 3b depict exemplary shelving racks 12. The shelving racks 12 include multiple parallel vertical levels having a height y', where inventory 08 may be stored on each vertical level. Each vertical level has a total width x'. Each vertical level is further divided horizontally to present a plurality of compartments 16, as shown in FIG. 4. Each compartment 16 has a width x, height y, and depth (not explicitly shown). Furthermore, each compartment 16 presents an effective width ex, height ey, and depth (not explicitly shown), each being slightly less than the width x, height y, and depth, respectively, due to the barriers segmenting the compartments 16.

The embodiment illustrates a robotic carriage 20 operable to transport inventory 08 in response to control server 42 signals, facilitating its controlled storage and retrieval. The robotic carriage 20 is configured to travel horizontally (x direction) and vertically (y direction), in exemplary configuration, along a track system 32, from the shelving rack 12 to a workstation proximate the shelving rack 12. The track system 32 supports and guides the robotic carriage 20 within the compartment 16 area of the shelving rack 12. The illustrated track system 32 is disposed in front of shelving rack 12 and includes lower and upper tracks. The lower track is laid on ground generally parallel to the lower portion of the shelving rack 12 while the upper track is positioned vertically above lower track and generally parallel to the upper portion of the shelving rack 12.

Figure 5:
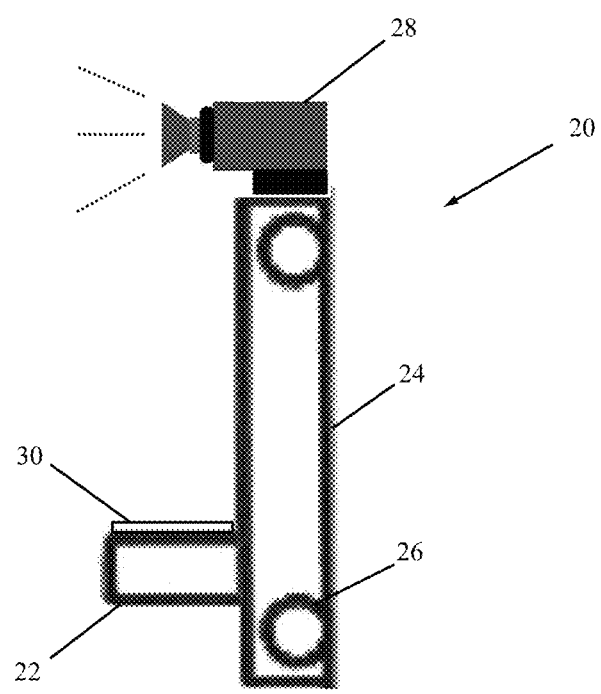
FIG. 5 shows a configuration of a robotic carriage of the current invention.

FIG. 5 depicts a side view of an exemplary robotic carriage 20. It includes a base 24, at least one arm 22, and a motor 26. The base 24 is vertically oriented and includes a front and rear. The arm is 22 is movably secured to the base 24, being operable to travel the vertical span presented by the base 24. The arm 22 extends distally from the front of the base 24 and presents a resting surface for items 08. A motor 26 is cooperatively secured to the arm 22 providing lift (y) and extension (depth). The exemplary motor 26 accepts variable speed input as control signal input and provides arm 22 travel distance and relative position output signals.

Optionally, the arm 22 incorporates a load sensor 30, operable to measure the weight of an item 08. As used within this specification, a load sensor can include scale or other weight measures known in the art. In exemplary configuration, the load sensor 30 is secured to the resting surface of the arm 22 and covering a substantial portion of the resting surface. The load sensor 30 provides weight as an output signal.

Some configurations of the system incorporate a camera 28 in communication with the control server 32, operable to capture images proximate the robotic carriage 20. A representative suitable camera 28 is a simple optical, digital camera. The camera 28 provides image data as output. In exemplary use, the camera 28 is mounted to the robotic carriage 20 such that it captures images from a frontal, "first person" perspective, including an item resting on the arm 22 or a compartment 16 in front of the robotic carriage 20. In an alternate configuration, a camera 28 is disposed distal to the robotic carriage 20 and with a field of view encompassing that of the robotic carriage 20. In yet another alternate configuration, a camera 28 is proximate and associated with a compartment 16 with a field of view encompassing that compartment 16.

A control server 42 and control interface 44, operable to issue control signals and receive output are in communication with the robotic carriage 20 over a communication link 36. The communication link 36 may be a wireless link such as simplex radio frequency or 802.11, a wired link such as electrical cable or fiber optic cable, or other suitable link.

As disclosed, a control server 42 is a computer operable to issue control signals and receive output. A computer or server, generally refers to a system which includes a processor, memory, a screen, a network interface, storage, and input/output (I/O) components connected by way of a data bus. The I/O components may include for example, a mouse, keyboard, buttons, or a touchscreen. A server contains various server software programs and preferably contains application server software. Those skilled in the art will appreciate that the computer or servers can take a variety of configurations, including personal computers, hand-held devices, multi-processor systems, microprocessor-based electronics, network PCs, minicomputers, mainframe computers, and the like. Additionally, the computer may be part of a distributed computer environment where tasks are performed by local and remote processing devices that are communicatively linked. One skilled in the art can understand that the structure of and functionality associated with the aforementioned elements can be optionally partially or completely incorporated within one or the other, such as within one or more processors.

The system includes specialized storage in the form of a database 40 configured to store shelving environment configuration data. In exemplary configuration, shelving content data, inventory data, user data, and robotic carriage queue data, and robotic carriage historical data associated with a specific operating environment are received. One skilled in the art would appreciated that the data may reside in one or more databases, tables, or computers. Representative suitable database systems include MySQL, PostgreSQL, SQLite, Microsoft SQL Server, Oracle, or dBASE.

Figure 6:
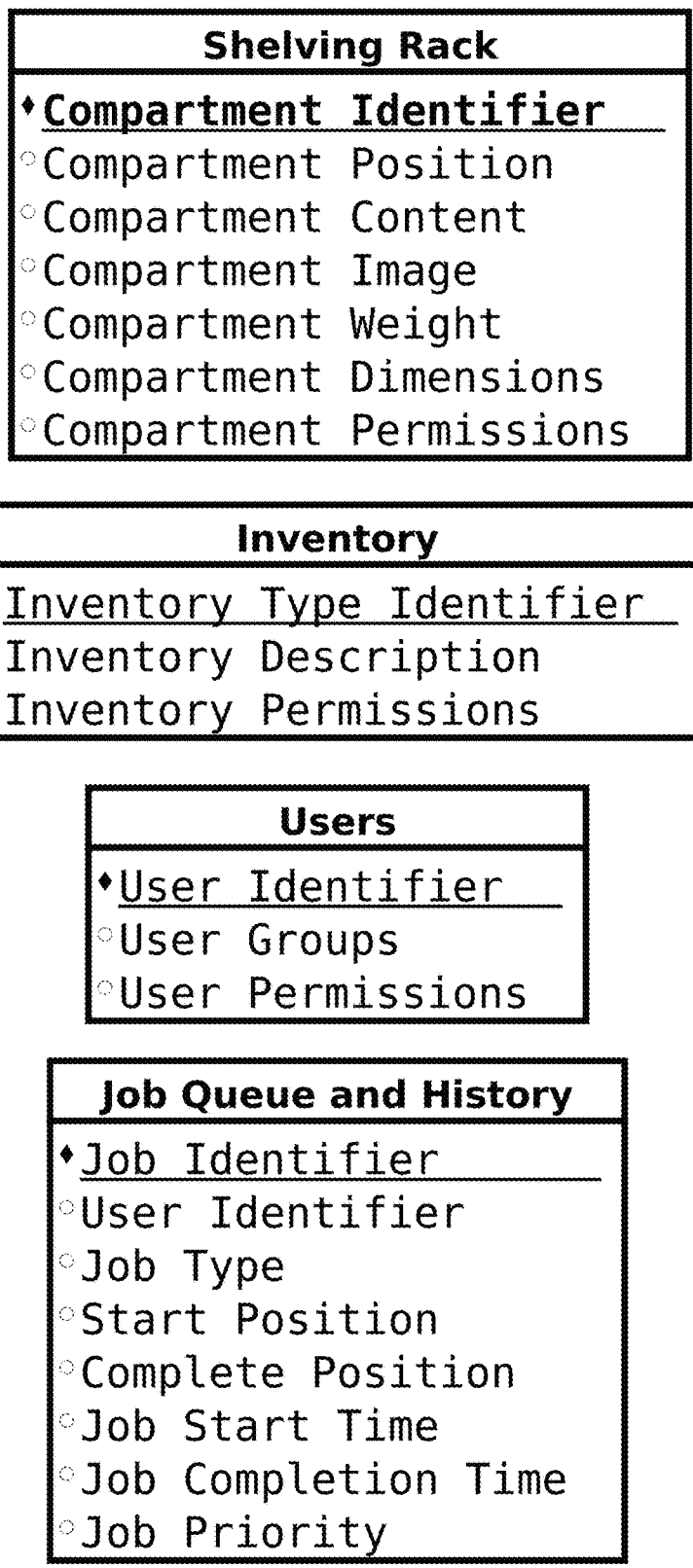
FIG. 6 shows a partial database schema of one configuration of a system according to the current invention.

A partial representative database 40 schema is illustrated in FIG. 6. A shelving rack table includes rows having a compartment 16 identifier. Each compartment 16 is assigned an identifier. Associated compartment 16 position data is also stored. It can be stored in the form of x, y, z coordinates, relative positioning, or other forms known in the arts. Associated compartment 16 dimensions are included in the database, preferably in the form of effective width ex, height ey, and depth. It can be represented by offset information relative to the interior x, y, z coordinates. Associated compartment 16 content is also stored. The content can be described by inventory type identifier, text, or other descriptive means. The shelving rack table can also include associated image data and weight data. For access control, permission data may also be associated with a compartment 16. Permission settings may authorize specific individuals or groups' access to the compartment, image data, or other record data.

One configuration of the database 40 includes tables for receipt of robotic carriage 20 travel parameters for the shelving environment. Representative travel parameters include coordinates for bounds in the x, y, or z direction, a maximum speed in the x, y, or z direction, a maximum acceleration in the x, y, or z direction, or a pickup height within a compartment 16.

It is within the spirit of the invention for database-wide settings. For example, FIGS. 3a and 3b depict compartments 16 of uniform dimension. Accordingly, compartment 16 dimensions and offsets can be table wide. Conversely, it should be understood, that the system can receive non-uniform shelving configurations as input.

An inventory table includes rows having an inventory type identifier. The inventory type identifier may be a stock keeping unit (SKU) number or other similar descriptors known in the art. An associated inventory description can also be stored. For access control, permission data may also be associated with an inventory type. Permission settings may authorize specific individuals or group access to the subject inventory type.

A user table includes rows having a user identifier. The user identifier may be an arbitrary username, full name, employee number, or other similar identifiers known in the art. Permission information associated with a user may authorize certain robotic carriage 20 operations, inventory access, or other actions. Representative access restricted controlled activities include inventory storage, inventory retrieval, inventory move, view inventory, and robotic operation configuration. The user can also be associated with a group, enabling alternate permission determination by the system.

A robotic carriage 20 activity table configured for history and queue actions includes rows having a job identifier. The job identifier is a system generated number for the activity. The user identifier is the associated user or users who created, modified, or otherwise acted in the subject activity. The job type includes the type of action performed, commonly a storage or retrieval operation. The job status indicates the progress of the activity. The job start position and job complete position indicate the initial and final robotic carriage 20 positions, respectively. It can be represented by a compartment 16 identifier, x/y/z coordinates, or other position indicators. The job start time and job complete time document the activity times, respectively.

The system presents a control interface 44 to one or more simultaneous system users operable to receive job requests for the robotic carriage 20. The exemplary control interface 44 is one presented by the server 42 over a network to a web browser. In alternate configurations, the control interface 44 is presented on a smartphone or on a display 43. Representative job requests include inventory storage, inventory retrieval, inventory moves, and viewing inventory. The control interface 44 may include a user input priority for association with the job request.

In one configuration, the control server 42 receives the control interface 44 input, translates the input into necessary control signals for the robotic carriage 20 to carry out a job request, and issues control signals over the communication link 36. In order to facilitate simultaneous, plural control interface 44 inputs, the database 40 optionally includes a job queue. The control server 42 adds a job identifier, the user's identifier, the job type, the robotic carriage 20 starting position (for example, retrieved from a coordinate lookup based on the source compartment 16 identifier), and the robotic carriage 20 terminal position (for example, retrieved from a coordinate lookup based on the destination compartment 16 identifier) to the job queue table for later execution by the system. The system periodically polls the job queue table for active jobs to execute and may execute jobs based on a priority (user based or system calculated), optimized path planning, or other factors.

Figure 2:
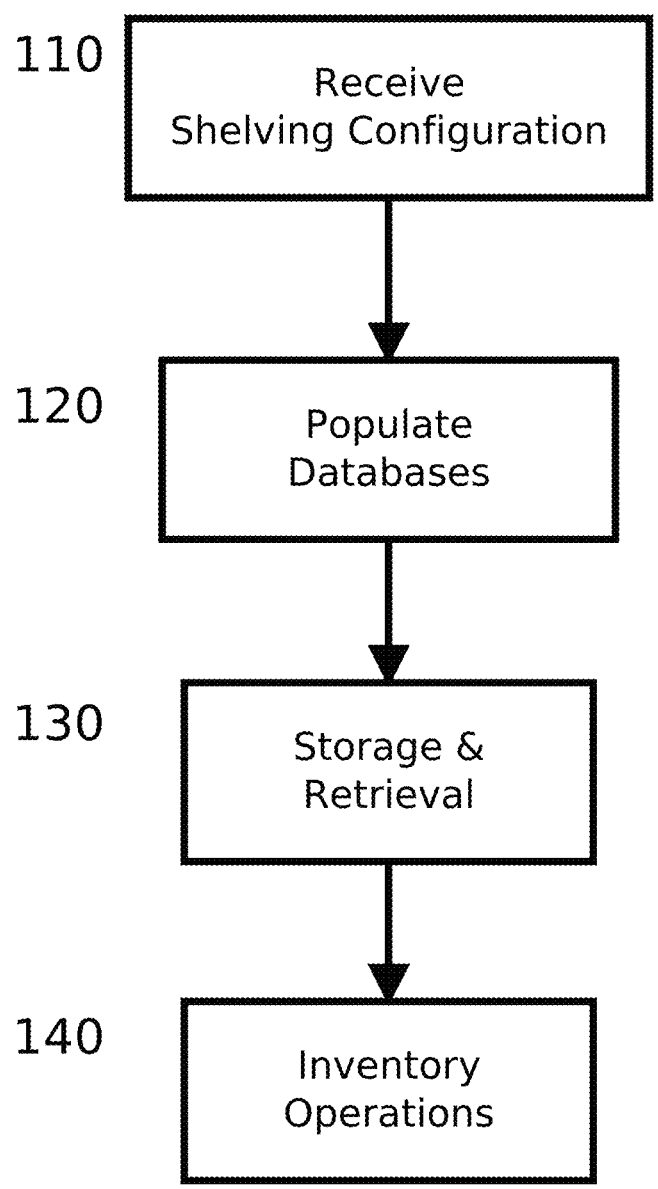
FIG. 2 shows a flowchart of a process according to the current invention.

Having described key components, a process according to the current invention is shown. FIG. 2 depicts an exemplary process. At step 110, a shelving configuration is received. At step 120, the databases are initialized and pre-populated. At step 130, inventory is stored and retrieved. At step 140, inventory operations are performed. Each of these steps will be considered in more detail below.

At step 110, a shelving rack configuration is received. A particular warehouse will have a need for a number of units of storage for a particular location. Accordingly, it will deploy a selected number of shelving racks 12 having a selected number of vertical levels, a selected number of horizontal columns, and a necessary compartment 16 volume. FIG. 3a and FIG. 4 depict a representative shelving rack 12 configuration. Although, FIG. 3a and FIG. 4 depict a single shelving rack 12 and having a single face of compartments 16, and in turn one robotic carriage 20, it is within the spirit of this invention to receive a shelving rack configuration having plural shelving racks 12 and plural robotic carriages 20, such as that of FIG. 3b.

At step 120, the databases are initialized and pre-populated. As previously disclosed in the representative partial database schema, exemplary tables include a shelving rack table, an inventory table, a user table, and a job activity table. In initializing the shelving rack table, rows, "slices," or other data structures are created to represent the compartments 16. For illustration purposes, FIG. 3a includes a grid showing the vertical and horizontal levels. It also shows the width (x) and height (y) of a cartesian coordinate based reference position system. Based on the received shelving configuration, the databases are initialized and pre-populated. Compartment 16 identifiers are assigned, compartment 16 position information is stored, interior compartment 16 position information is stored, and compartment 16 dimensions, including depth, are stored.

The paired track system 32 enabling robotic carriage travel path over the x,y plane presented by the shelving rack configuration is setup. The outer bounds of the travel path are stored and the robotic carriage 20 is calibrated to that width (x) and height (y) range.

Next, the inventory table is input. The inventory type identifier and associated inventory descriptions are input and stored in the database 40.

Users are input into the system. FIG. 7 depicts a representative interface. It includes fields for a username, contact information, password, and a permission list for storing, retrieving, and viewing inventory. The associated username, contact information, and permission set are stored in the user table.

Figure 8A:
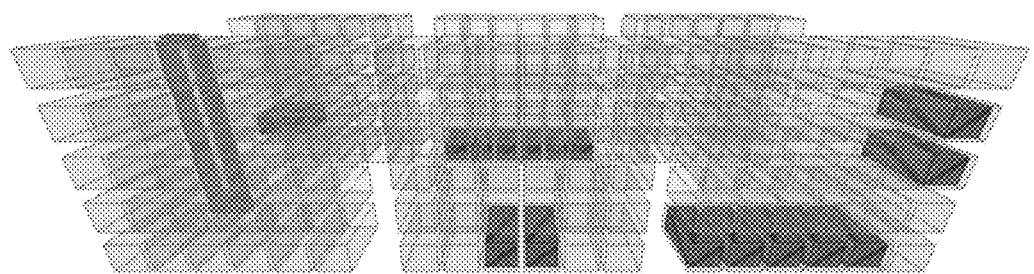
FIGS. 8a and 8b show a representative partial interface for display and interaction with a shelving rack configuration and inventory.
Figure 8B:
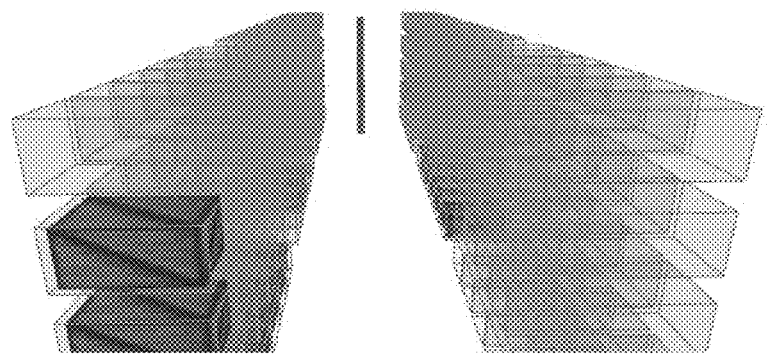
Figure 8C:
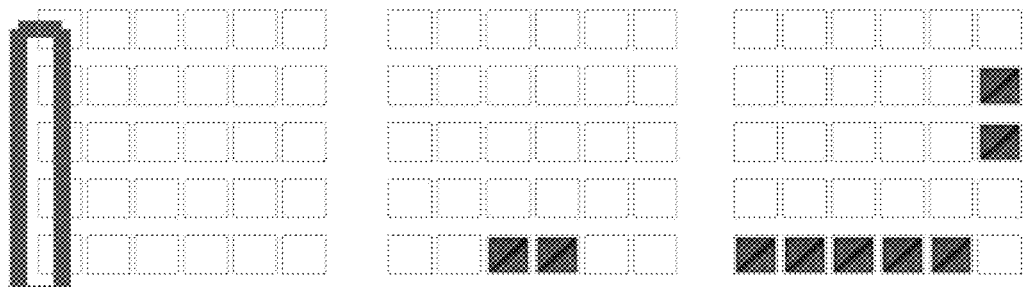
FIGS. 8c and 8d show an alternate representative partial interface for display and interaction with a shelving rack configuration and inventory.
Figure 8D:
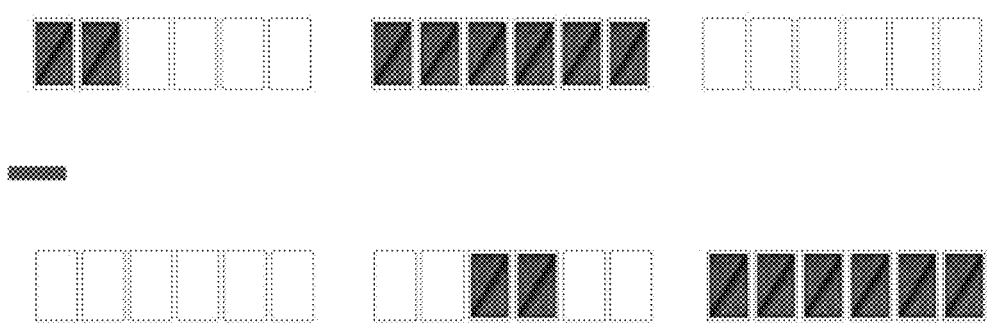

At step 130, inventory 08 is stored and retrieved by the system. One or more users of the system initiates the process of moving inventory 08. The system presents an interface to the user to select an item 08 to move and its intended destination. FIGS. 8a-8d depict a partial interface. The computer 32 renders a likeness of the shelving rack 12 based on current stored inventory. The computer 32 retrieves the shelving rack configuration from the database 40, retrieving, the position of each compartment 16, the dimensions of each compartment 16, and the content status of each compartment 16. Based on the retrieved data, the computer 32 renders a scaled, spatially accurate, interactive model of the shelving rack 12. The model displays a representation of each compartment 16 of the shelving rack 12 in its proper relative orientation with optional varying indicia for compartment 16 status such as inventory type, inventory category, inventory volume, compartment occupancy, and the like. In an exemplary configuration, the system uses one indicia for full compartments 16 and another for available compartments 16. An additional icon is added for the workstation. FIGS. 8a and 8b depict a near 3 dimensional model from a front and side perspective, respectively. FIGS. 8c and 8d depict a 2 dimensional model from a front and top perspective, respectively. Where the user seeks to store inventory 08, he can select the workstation as the source and an available compartment 16 as the destination. Where the user seeks move inventory 08 within the shelving rack 12, he can select the occupied compartment 16 as the source and an available compartment 16 as the destination. Where the user seeks to retrieve inventory 08, he can select the occupied compartment 16 as the source and the workstation as the destination. Upon confirmation of the permission for storage or retrieval and permission to interact with the underlying inventory type, the computer 32 adds a job identifier, the user's identifier, the job type, the robotic carriage 20 starting position, and the robotic carriage 20 terminal position to the job queue table for further processing by the system.

The system periodically polls the job queue table for active jobs. Where there is an active request to move inventory 08 within the shelving rack 12, the control server 42 logs the job task start time, issues a control signal to the robotic carriage 20 to travel to the source compartment 16, retrieving the source compartment 16 location from the database 40. The control server 42 issues a control signal to extend the arm 22, retrieve the inventory 08, and retract the arm 22. The server 32 captures the load sensor 30 readings and camera 28 images of the now available compartment 16 and the inventory 08. The control server 42 issues a control signal to the robotic carriage 20 to travel to the destination compartment 16, retrieving the destination compartment 16 location from the database 40. The control server 42 issues control signals to extend the arm 22, release the inventory 08, and retract the arm 22. The control server 42 again captures the load sensor 30 readings and camera 28 images of the now occupied compartment 16 along with the inventory 08. The inventory status of each compartment 16 is updated and the captured data is stored in the shelving and job tables. Similar steps are performed for inventory and retrieval jobs.

At step 140, inventory operations are performed. One inventory operation is to view the status of a compartment 16. The system presents an interface to the user to select a compartment 16. Again, FIGS. 8a-8d depict a partial interface The computer 32 renders a scaled, spatially accurate, interactive model based on current stored inventory and representing each compartment 16 of the shelving rack 12 in its proper relative orientation with different indicia for full compartments 16 and available compartments. In this case, with proper permissions, the user can select a compartment 16 from the interface and view the current and historical details of the compartment 16. The user can view the inventory data, image data, and weight data over time, as shown in FIG. 9.

While the foregoing detailed description has disclosed several embodiments of the invention, it is to be understood that the above description is illustrative only and not limiting of the disclosed invention. It will be appreciated that the discussed embodiments and other unmentioned embodiments may be within the scope of the invention.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for storage and retrieval of items, said system comprising:
    a control server and a database;
    the database configured for receipt of shelving configuration information of a user environment, said shelving configuration information including dimensional and positional information for compartments, the database further configured for receipt of user permission for said compartments;
    said control server having an input for at least one control interface; and
    said control server operable to issue travel control signals to a robotic carriage in response to control interface input and within configuration data parameters retrieved from said database; and
    receiving a job request for a storage or retrieval operation for a user for a compartment;
    said control server retrieving said user permission for said compartment of said job request, authorizing said retrieved user permission against said user of said job request, conditionally performing said job request based on said job request compartment and said retrieved associated user permission data of said compartment, authenticating said user permission for said storage or retrieval operation from at least one of the following: compartment access, inventory operation type, and inventory type.

2. The system of claim 1, further comprising a real-time or near real-time scaled, spatially accurate, interactive model compartment selection interface based on the shelving configuration and compartment content information of said database.

3. The system of claim 1, further comprising a camera in communication with said control server, said control server is configured to capture camera data in response to a storage or retrieval operation.

4. The system of claim 1, wherein said control interface is presented over a web browser interface.

5. The system of claim 1, further comprising a load sensor, wherein said database comprises load sensor data associated with a compartment.

6. A system for storage and retrieval of items, said system comprising:
    a control server and a database;
    the database configured for receipt of shelving configuration information of a user environment, said shelving configuration information including dimensional and positional information for compartments; and
    said control server having an input for at least one control interface; and
    said control server operable to issue travel control signals to a robotic carriage in response to control interface input and within configuration data parameters retrieved from said database;
    said control interface configured for receipt of job requests;
    a real-time or near real-time scaled, spatially accurate, interactive model compartment selection interface based on the shelving configuration and compartment content information of said database;
    a load sensor, said control server is configured to capture load sensor data in response to a storage or retrieval operation, associate said captured load sensor data with a subject compartment, and store said captured load sensor data in said database.

7. The system of claim 6, further comprising a camera in communication with said control server, said control server is configured to capture camera data in response to a storage or retrieval operation.

8. The system of claim 6, wherein said control interface is presented over a web browser interface.

9. A system for storage and retrieval of items, said system comprising:
    a control server and a database;
    the database configured for receipt of shelving configuration information of a user environment, said shelving configuration information including dimensional and positional information for compartments; and
    said control server having an input for at least one control interface; and
    said control server operable to issue travel control signals to a robotic carriage in response to control interface input and within configuration data parameters retrieved from said database;
    said control interface configured for receipt of job requests;
    a real-time or near real-time scaled, spatially accurate, interactive model compartment selection interface;
    said selection interface presenting a plurality of compartments, the number and relative position corresponding to said received shelving configuration information, each of said compartments having a display representation corresponding to its real-time or near real-time compartment content information within said database.

10. The system of claim 9, wherein said display representation is defined by transparency for an open compartment and opacity for an occupied compartment.

11. The system of claim 9, further comprising a camera in communication with said control server, said control server is configured to capture camera data in response to a storage or retrieval operation.

12. The system of claim 9, wherein said control interface is presented over a web browser interface.

* * * * *